(12) United States Patent
MacLeod et al.

(10) Patent No.: US 6,356,901 B1
(45) Date of Patent: Mar. 12, 2002

(54) METHOD AND APPARATUS FOR IMPORT, TRANSFORM AND EXPORT OF DATA

(75) Inventors: Stewart P. MacLeod, Redmond; Casey L. Kiernan, Kirkland, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/212,989

(22) Filed: Dec. 16, 1998

(51) Int. Cl.$^7$ .............................................. G06F 17/30
(52) U.S. Cl. ............................. 707/6; 707/10; 707/204
(58) Field of Search ................................. 709/217, 218; 707/315, 6, 10, 204, 102, 104, 501, 513, 7, 201

(56) References Cited

U.S. PATENT DOCUMENTS

| | | | | |
|---|---|---|---|---|
| 5,734,905 A | * | 3/1998 | Oppenheim | 709/315 |
| 5,781,911 A | * | 7/1998 | Young et al. | 707/201 |
| 5,937,415 A | * | 8/1999 | Sheffield et al. | 707/204 |
| 5,991,760 A | * | 11/1999 | Gauvin et al. | 707/10 |

OTHER PUBLICATIONS

Using DTS to populate a data warehouse (Apr. 1999) www.sqlmag.com/Articles/Index.cfm?ArticleID–5105&pg–2, (pp. 1–3).*
Data Transformation Services (DTS) (Sep. 6, 2001) www-.microsoft.com/sql/evaluation/features/datatran.asp (pp. 1–2).*

* cited by examiner

Primary Examiner—Diane Mizrahi
(74) Attorney, Agent, or Firm—Woodcock Washburn LLP

(57) ABSTRACT

A user specifies source data, optional transformations and defines a destination database, as well as its location. The user specification creates a package. A package consists of steps of associated tasks, with each step optionally having one or more precedence constraints. Execution of the package causes a data pump to import the user-specified data, conform the data in accordance with the user's definition of the destination database and export the data to that database. Processing occurs on a streaming, contiguous basis. As each row is pulled from source database into data pump, the user-defined transform is optionally applied and data lineage information is bound to the data.

17 Claims, 13 Drawing Sheets

```
'*******************************************
' Visual Basic Transformation Script
' Copy each source column to the
' destination column
'*******************************************

Function Main()
    DTSDestination("au_id") = DTSSource("au_id")
    DTSDestination("au_lname") = DTSSource("au_lname")
    DTSDestination("au_fname") = DTSSource("au_fname")
    DTSDestination("phone") = DTSSource("phone")
    DTSDestination("address") = DTSSource("address")
    DTSDestination("city") = DTSSource("city")
    DTSDestination("state") = ucase(DTSSource("state"))
    DTSDestination("zip") = DTSSource("zip")
    DTSDestination("contract") = DTSSource("contract")
    DTSDestination("Lineage_Full") = DTSSource("DTSLineage_Full")
    DTSDestination("Lineage_Short") = DTSSource("DTSLineage_Short")
    Main = DTSTransformStat_OK
End Function
```

FIGURE 8

METHOD AND APPARATUS FOR IMPORT, TRANSFORM AND EXPORT OF DATA

CROSS REFERENCE TO RELATED APPLICATIONS

This application is related by subject matter to the inventions disclosed in commonly assigned pending U.S. patent application Ser. No. 09/212,238, filed on Dec. 16, 1998 even date herewith, entitled "DATA LINEAGE DATA TYPE" and pending U.S. patent application Ser. No. 09/212,218 filed on Dec. 16, 1998 even date herewith, entitled "DATA LINEAGE".

TECHNICAL FIELD

The present invention relates generally to databases and data warehouses, and more particularly to an elegant system and method for integrating and constructing a data warehouse or other data storage area.

BACKGROUND OF THE INVENTION

In recent decades, as the computational and storage capacity of computer systems has improved, business record keeping has for the most part become automated. Thus, businesses have come to rely heavily on large-scale databases of sales, billing, payroll and other data, typically stored on magnetic storage media.

From the perspective of the information technology professional, such databases can conventionally be organized and maintained using variety of Database Management Systems ("DBMS"). Among such database systems, those adhering to a "relational" model, Relational Database Management Systems ("RDBMS"), are likely the most popular.

A relational database is a collection of data that is organized in related two-dimensional tables of columns and rows. Data in a table can be accessed and manipulated by performing set operations on the tables, such as join, sort, merge, and so on. These operations are typically initiated by way of a user-defined query that is constructed in a query language such as Structured Query Language (SQL). SQL queries consist of high level commands which typically describe the data set to be selected, retrieved or processed.

While RDBMS databases clearly represent an advance over earlier manual record keeping, from an enterprise wide perspective, such databases are often not organized or designed with a view toward optimal efficiency. In particular, an enterprise will typically maintain and support several databases and record file stores, each respectively serving the particular needs of sales, billing and marketing departments, for example, or even of particular individuals. The information in these databases will generally overlap somewhat, resulting in duplication of effort to one degree or another. In addition, this decentralized, piecemeal collection of databases may render many applications, particularly applications involving enterprise-wide data relationships, difficult and cost ineffective to implement.

In an effort to address this problem, more and more businesses have turned to the creation of "data warehouses." These typically large-scale databases provide a storehouse for data, generally accumulated over years, and generated from a variety of database locations and applications. In the best case, such data warehouses are organized and maintained using a DBMS flexible enough to implement all applications of current interest, as well as to anticipate future applications.

Unfortunately, while data warehouses should result in efficiency savings over the long run, the design and creation of such databases is in general a time consuming, costly project. For example, because data must be integrated from a variety of database locations and applications, multiple data conversions must take place (e.g., of text, spreadsheet or tabular data). Each such conversion might require its own application software.

In addition, even where all source data is in a relational tabular (RDBMS) format, the selection of whole tables of data, perhaps consisting of millions of rows, for export to a data warehouse can be very time consuming and taxing of computational resources. In particular, while query languages allow the specification of data selection-using constructs similar to natural English, they do not allow developers to specify the actual procedure used to accomplish data selection. Thus, the procedure which actually implements the data selection may not be suitable for all applications (e.g. data warehouse creation). For example, an SQL selection of a stored table for export to a data warehouse would first result in the creation of the entire table in memory, possibly stretching the system's computational resources to the limit.

In addition, depending on the desired characteristics of the data warehouse, source data bound for the data warehouse may need to first undergo transformation (e.g. division, combination, creation of new and complex mathematical relationships). Such transformation adds yet another step in the design process, and depending on its complexity, may require the application of programming languages requiring specialized knowledge (e.g., COBOL, C++).

Moreover, once data bound for a data warehouse is selected and optionally transformed, it must be integrated and stored with other data, all conformed to new access constructs consistent across the data warehouse. For example, if two tables, each with a customer Social Security number field, are bound for a data warehouse, one may use an "SSNum" naming convention, while another might use a "Social Security" naming convention to refer to the same data type. Ensuring such consistency may be time consuming, as it may involve: 1) selecting the first table using SQL; 2) changing field names; 3) storing the first table; 4) selecting the second table using SQL, and so on.

In short, what is needed is a cost effective, time efficient system and method for integrating and constructing a data warehouse or other data storage area in accordance with desired design characteristics.

SUMMARY OF THE INVENTION

Briefly, the present invention is directed toward technology that provides users with powerful tools necessary to manage and exploit data. In particular, the present invention is directed to a single "data pump" application environment, which allows developers to specify the import (selection), transformation and export of data to a desired destination location, all on a streaming, contiguous basis. As buffering allows the synchronization of the import and export steps, source data can be fetched, processed and exported a subset at a time, without the creation of whole sets of source data in memory. Thus, computational resources are spared.

The data pump processes may preferably be initiated by execution of instructions in pre-stored task modules. For example, execution of such instructions may cause selection (importation) of specified source data. In addition, the present invention preferably utilizes data interface drivers for each respective type of source data, thus allowing conversion to a relational (tabular) format. Therefore, selection instructions in task modules may consist of query language commands, such as SQL commands.

The data pump process may also execute instructions in pre-stored task modules to accomplish transformations of data in accordance with whatever degree of complexity is desired. Preferably, the task modules incorporate conventional language scripts, allowing specification of complex data transformations in conventional programming languages with a minimum of technical knowledge.

Thus, the present invention combines the ease of use of conventional, high-level query commands, with the control capability of more procedural programming languages.

Moreover, the present invention preferably incorporates easy to use user interfaces. These allow, for example, the intuitive specification of destination location (for export), as well as the correspondence of source and destination access constructs (e.g. of source and destination tabular column names). Thus, the present invention allows the specification of consistent access constructs across destination site data, when this characteristic is desired.

In addition, the present invention may also incorporate the creation of data lineage identifiers which track the task modules described above, or specific versions of such task modules. Thus, the lineage identifier can provide details about data pump transformations undergone by the data. For example, the lineage identifier can act as a pointer to detailed history files of operations that were performed on data and transformed it into its current form.

Preferably, a lineage identifier is added to each row in a table. The lineage identifier can then be used to trace the source of the data, i.e., data having a common identifier share a common history.

Further benefits and advantages of he present invention will be made more apparent in the more detailed description below.

BRIEF DESCRIPTION OF THE DRAWINGS

FIG. 8 depicts ActiveX script instructions incorporated in a package for importing data into a database while adding data lineage information;

DETAILED DESCRIPTION OF THE INVENTION

OVERVIEW

The present invention is directed to a single "data pump" application environment, which allows developers to specify the import (selection), transformation and export of data to a desired destination location, all on a streaming, contiguous basis. Although the invention is described with respect to specific database architectures and data warehouse creation, the scope of the present invention is by no means limited to those contexts.

EXEMPLARY OPERATING ENVIRONMENT
1. A Computer Environment

Figure 1:
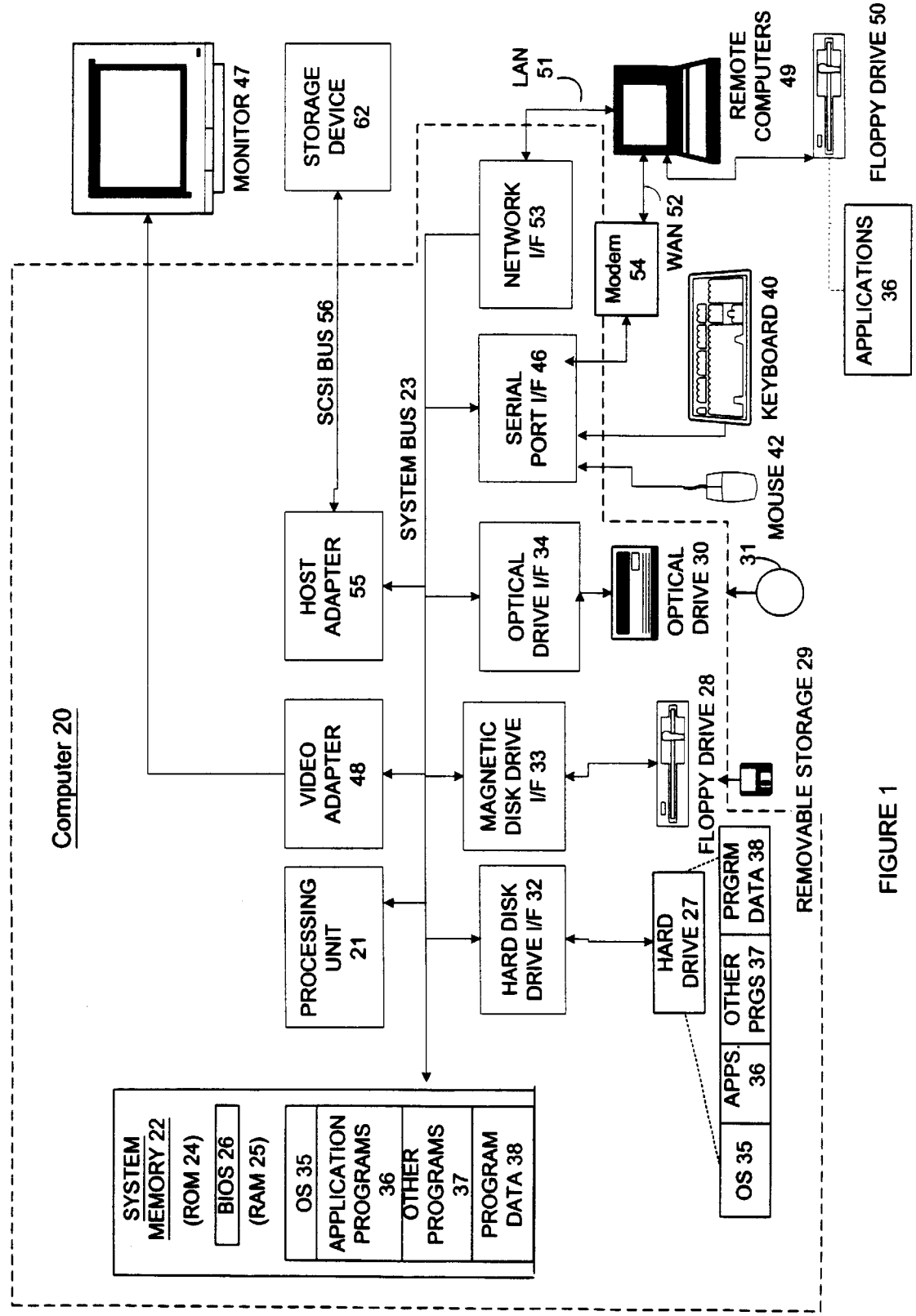
FIG. 1 is a block diagram representing a computer system in which aspects of the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a computer, such as a work station server.

Generally, program modules include routines, programs, objects, components, data structures and the like that perform particular tasks or implement particular abstract data types. Moreover, those skilled in the art will appreciate that the invention may be practiced with other computer system configurations, including hand held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment. Further, as used herein, the term "computer readable medium" includes one or more instances of a media type (e.g., one or more floppy disks, one or more CD-ROMs, etc.).

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

A personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, Intranets and the Internet. When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

2. A Network Environment

Figure 2A:
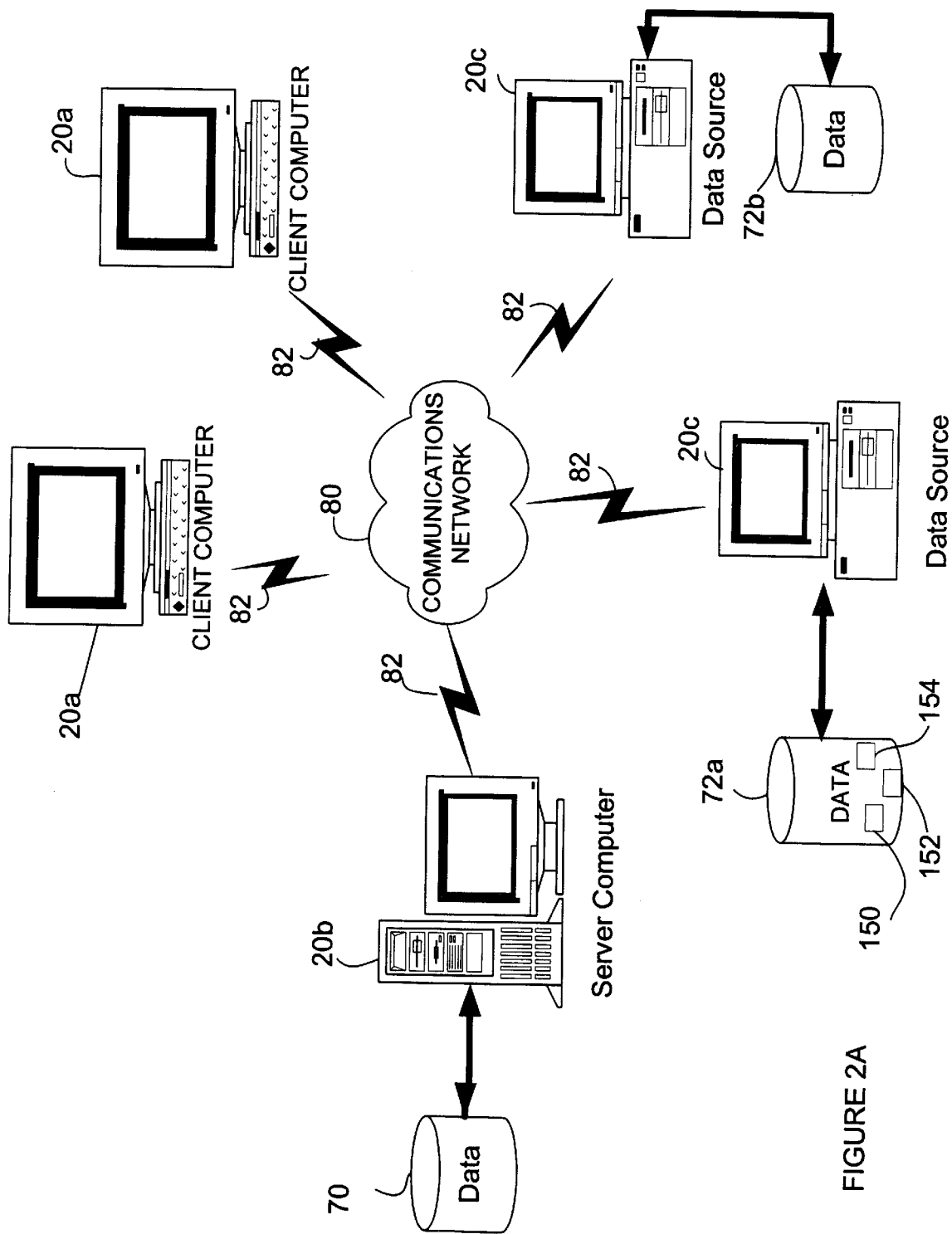
FIG. 2A is schematic diagram representing a network in which aspects of the present invention may be incorporated.

FIG. 2A illustrates an exemplary network environment in which the present invention may be wholly or partially employed. Of course, actual network and database environments can be arranged in a variety of configurations; however, the exemplary environment shown here provides a framework for understanding the type of environment in which the present invention operates. The network may include client computers 20a, a server computer 20b, data source computers 20c, and databases 70, 72a, and 72b. The client computers 20a and the data source computers 20c are in electronic communication with the server computer 20b via communications network 80, e.g., an Intranet. Client computers 20a and data source computers 20c are connected to the communications network by way of communications interfaces 82. Communications interfaces 82 can be any one of the well-known communications interfaces such as Ethernet connections, modem connections, and so on.

Server computer 20b provides management of database 70 by way of database server system software, described more fully below. As such, server 20b acts as a storehouse of data from a variety of data sources and provides that data to a variety of data consumers.

In the example of FIG. 2A, data sources are provided by data source computers 20c. Data source computers 20c communicate data to server computer 20b via communications network 80, which may be a LAN, WAN, Intranet, Internet, or the like. Data source computers 20c store data locally in databases 72a, 72b, which may be relational database servers, excel spreadsheets, files, or the like. For example, database 72a shows data stored in tables 150, 152, and 154. The data provided by data sources 20c is combined and stored in a large database such as a data warehouse maintained by server 20b.

Client computers 20a that desire to use the data stored by server computer 20b can access the database 70 via communications network 80. Client computers 20a request the data by way of SQL queries (e.g., update, insert, and delete) on the data stored in database 70.

3. Databases

Figure 2B:
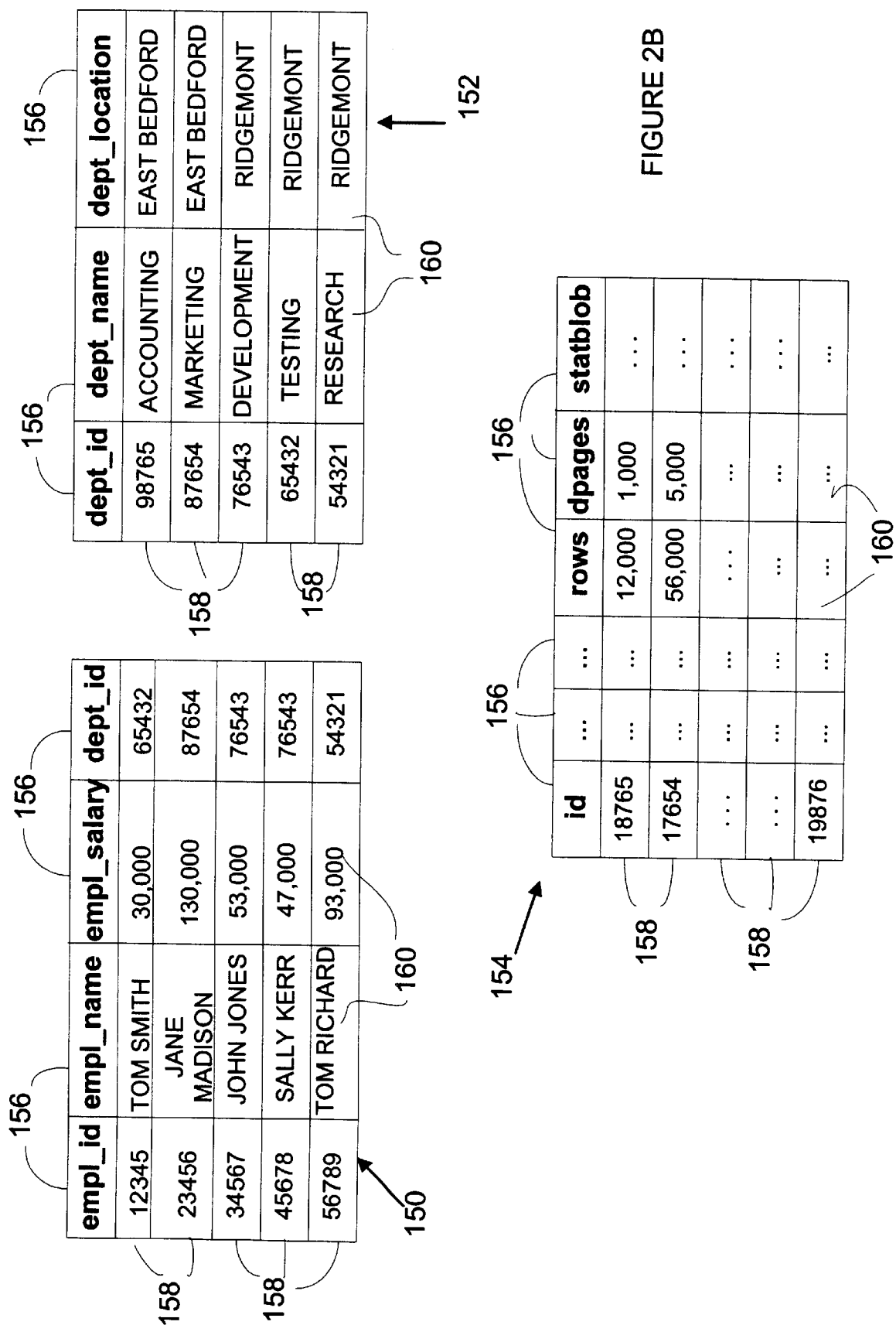
FIG. 2B is a diagram representing tables in an exemplary database.

A database is a collection of related data. In one type of database, a relational database, data is organized in a two-dimensional column and row form called a table. FIG. 2B illustrates tables such as tables 150, 152, and 154 that are stored in database 72a. A relational database typically includes multiple tables. A table may contain zero or more records and at least one field within each record. A record is a row in the table that is identified by a unique numeric called a record identifier. A field is a subdivision of a record to the extent that a column of data in the table represents the same field for each record in the table.

A database typically will also include associative structures. An example of an associative structure is an index, typically, but not necessarily, in a form of B-tree or hash index. An index provides for seeking to a specific row in a table with a near constant access time regardless of the size of the table. Associative structures are transparent to users of a database but are important to efficient operation and control of the database management system. A database management system (DBMS), and in particular a relational database management system (RDBMS) is a control system that supports database features including, but not limited to, storing data on a memory medium, retrieving data from the memory medium and updating data on the memory medium.

As shown in FIG. 2B, the exemplary database 72a comprises employee table 150, department table 152, and sysindexes table 154. Each table comprises columns 156 and rows 158 with fields 160 formed at the intersections. Exemplary employee table 150 comprises multiple columns 158 including empl_id, empl_name, and empl_salary, dept_id. Columns 158 in department table 152 include dept_id, dept_name, and dept_location. Sysindexes table 154 contains information regarding each table in the database.

Generally, data stored in a relational database is accessed by way of a user-defined query that is constructed in a query language such as SQL. Typically, for any given SQL query there are numerous procedural operations that need be performed on the data in order to carry out the objectives of the SQL query. For example, there may be numerous joins and table scans that need to be performed so as to accomplish the desired objective.

As noted control and management of the tables is maintained by a DBMS, e.g., a RDBMS.

4. SOL Server RDBMS Architecture

Figure 3:
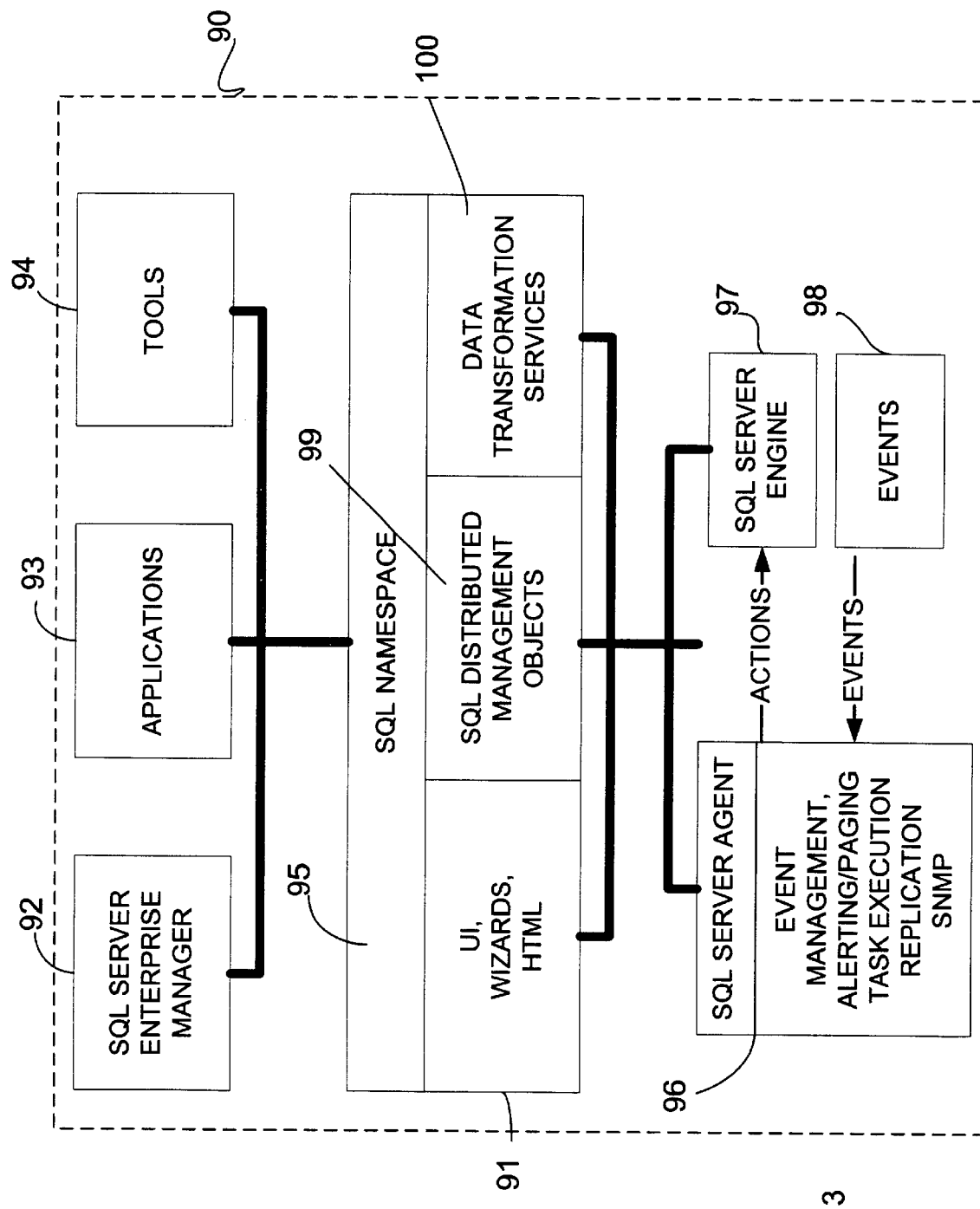
FIG. 3 is an architecture of an exemplary database management system.

An exemplary SQL Server RDBMS architecture 90 is graphically depicted in FIG. 3. The architecture comprises essentially three layers. Layer one provides for three classes of integration with the SQL Server, comprising: (1) a SQL Server Enterprise Manager 92 that provides a common environment for managing several types of server software in a network and provides a primary interface for users who are administering copies of SQL Server on the network; (2) an Applications Interface 93 that allows integration of a server interface into user applications such as Distributed Component Object Modules (DCOM); and (3) a Tools Interface 94 that provides an interface for integration of administration and configuration tools developed by Independent Software Vendors (ISV).

Layer two opens the functionality of the SQL server to other applications by providing three application programming interfaces (API): SQL Namespace 95, SQL Distributed Management Objects 99, and Data Transformation Services 100. A user interface 91 is provided by Wizards, HTML, and so on. SQL Namespace API 95 exposes the user interface (UI) elements of SQL Server Enterprise Manager 92. This allows applications to include SQL Server Enterprise Manager UI elements such as dialog boxes and wizards.

SQL Distributed Management Objects API 99 abstracts the use of DDL, system stored procedures, registry information, and operating system resources, providing an API to all administration and configuration tasks for the SQL Server.

In one embodiment of the present invention, the data pump application is incorporated as a part of Distributed Transformation Services API. Distributed Transformation Services API 100 exposes the services provided by SQL Server to aid in building data warehouses and data marts. As described more fully below, these services provide the ability to transfer and transform data between heterogeneous OLE DB and ODBC data sources. Data from objects or the result sets of queries can be transferred at regularly scheduled times or intervals, or on an ad hoc basis.

Layer three provides the heart of the SQL server. This layer comprises an SQL Server Engine 97 and a SQL Server Agent 96 that monitors and controls SQL Server Engine 97 based on Events 98 that inform SQL Server Agent of the status of the SQL Server Engine 97.

The Server Engine processes SQL statements, forms and optimizes query execution plans, and so on.

DATA PUMP

Figure 9:
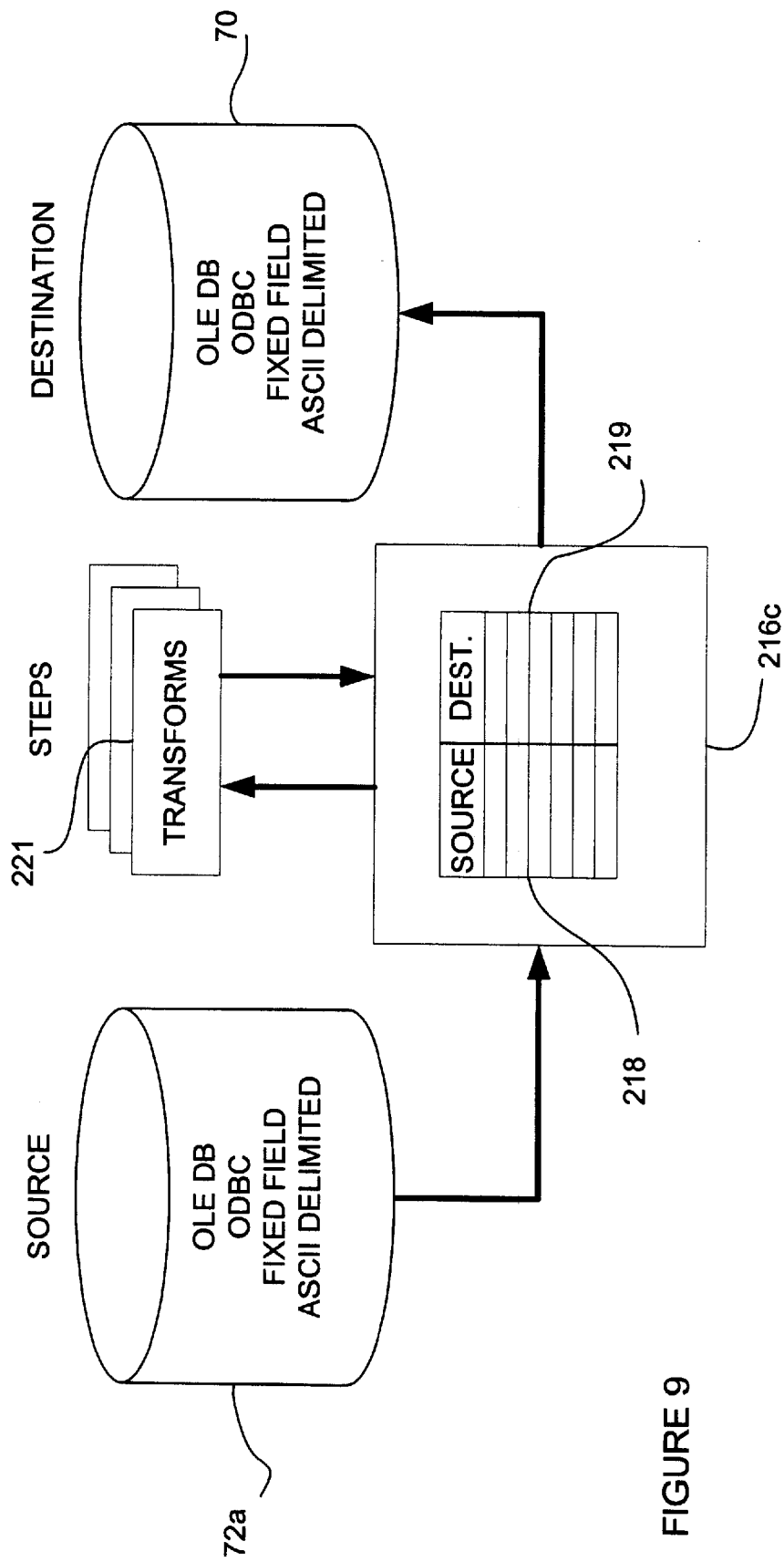
FIG. 9 is a data pump architecture for importing, transforming and exporting data to a destination database.

FIG. 9 schematically depicts the architecture of the data pump, which imports, optionally transforms and exports data to a desired destination location, all on a streaming, contiguous basis. As each row is pulled from source database, e.g., 72a into data pump 216c, a transform 221 is applied and data lineage information is bound to the data. The information is then pumped out into the destination database 70. Data pump 216c may be implemented as all or part of an application program 36 comprising instructions executed by a processing unit 21 of a computer system 20.

Figure 10:
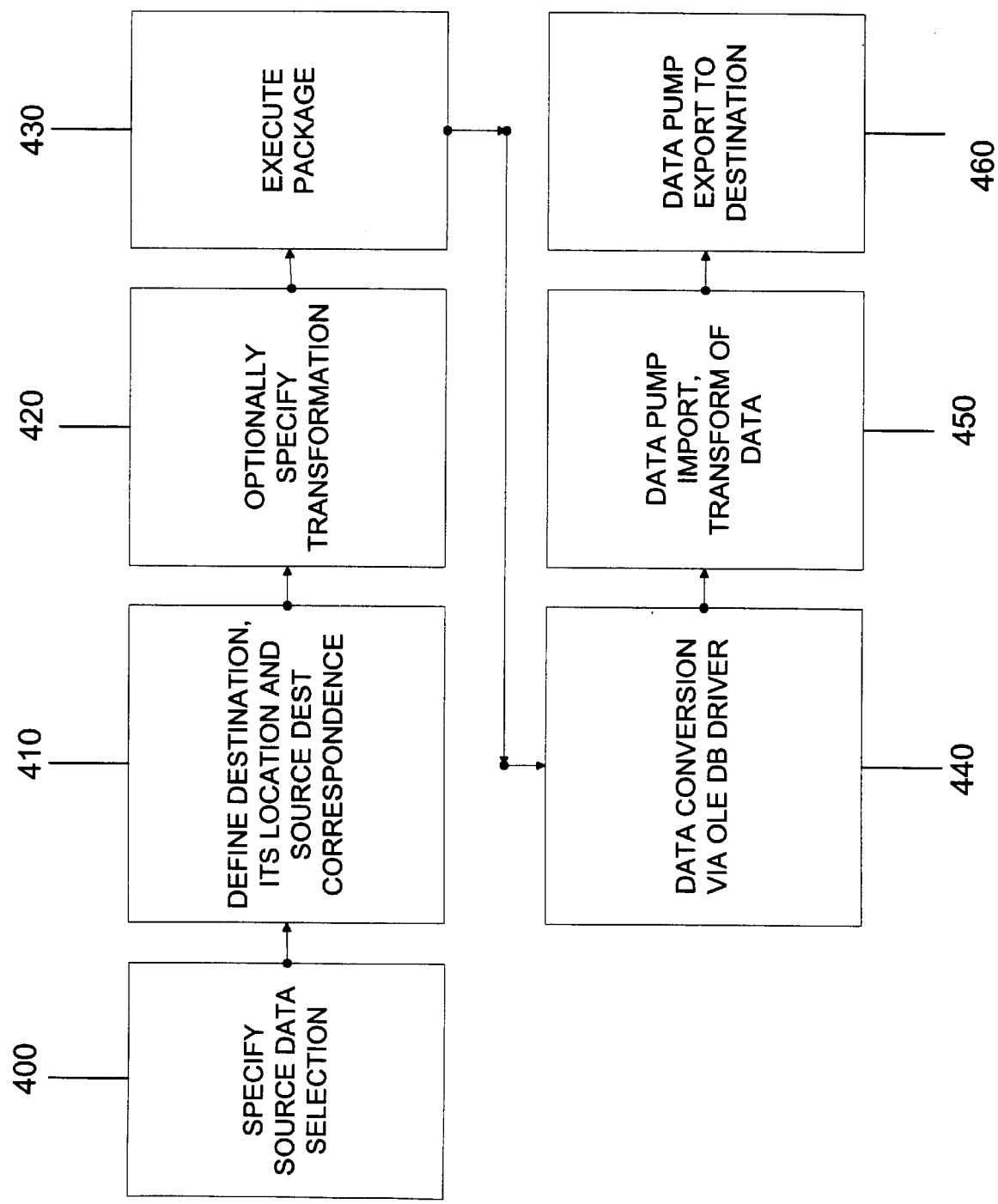
FIG. 10 is a high-level flow chart of an import, transform and export data pump process.

With FIG. 9 in mind, and turning now to FIG. 10, it shows high level flow chart of the import, transform and export data pump process shown schematically in FIG. 9. In Step 400, a developer specifies source data to be selected using conventional SQL commands. An exemplary user interface prompting a user for such command is described in greater detail below.

In one embodiment of the present invention, the query may specify source data from a stored database 72a. In an alternative case, the query may specify the tabular output of a program (task) module described above, which may itself comprise SQL query instructions. In still another case, the query may specify non-relational data (e.g. Excel), effectively treating the data as if were in a relational database data.

In Step 410, a developer defines a destination database (e.g., by specifying column names) and specifies its location. In addition, the developer can specify correspondence between source and destination data access constructs (e.g. of source and destination tabular column names). Again, an exemplary user interface prompting a user for such information is described in greater detail below.

In Step 420, a developer optionally specifies a transformation to be performed on the source data selected. Again, an exemplary user interface prompting a user for instructions is described in greater detail below. In addition, the interface may incorporate conventional language scripts, allowing specification of complex data transformations in conventional programming languages with a minimum of technical knowledge. Such language scripts are discussed below.

Completion of Steps 400–420 enables the user defined-creation of the program task modules described above. These may be referred to as "packages." Packages, comprising instructions which can be executed by a processing unit 21 of a computer system 20, are again discussed below.

In Step 430, the package created in Steps 400–420 is executed by a processing device 21 on a computer system 20.

As a result, in Step 440, source data 72a is converted into relational (tabular) form to facilitate selection in accordance with the developer's query specified in Step 400. In one embodiment of the present invention, OLE DB interface drivers, each corresponding to a different data type (e.g., Excel, textual data etc.) accomplish this conversion.

In Step 450, the query specified in Step 400 is executed. Accordingly, the data pump 216c opens a rowset (subset of rows) of the specified data 72a and causes importation of the data 72a into the data pump 216c, in row order. Furthermore, the transformation defined in Step 420 is executed, causing transformation of the open row set as desired, in row order.

In Step 460, the data pump 216c establishes a correspondence between columns of the open row set 218 to columns in the destination row set 219, thus establishing the correspondence of source and destination tabular column names as defined in Step 410. Once the source and destination data correspondence is established, the row set is exported in row order to the destination 70 defined in Step 410.

Note that as buffering allows the synchronization of Step 450 (import) and 460 (export), these steps can be executed in parallel. Thus, source data can be fetched, processed and exported in streaming fashion, without the creation of whole sets of source data in memory.

Figure 4:
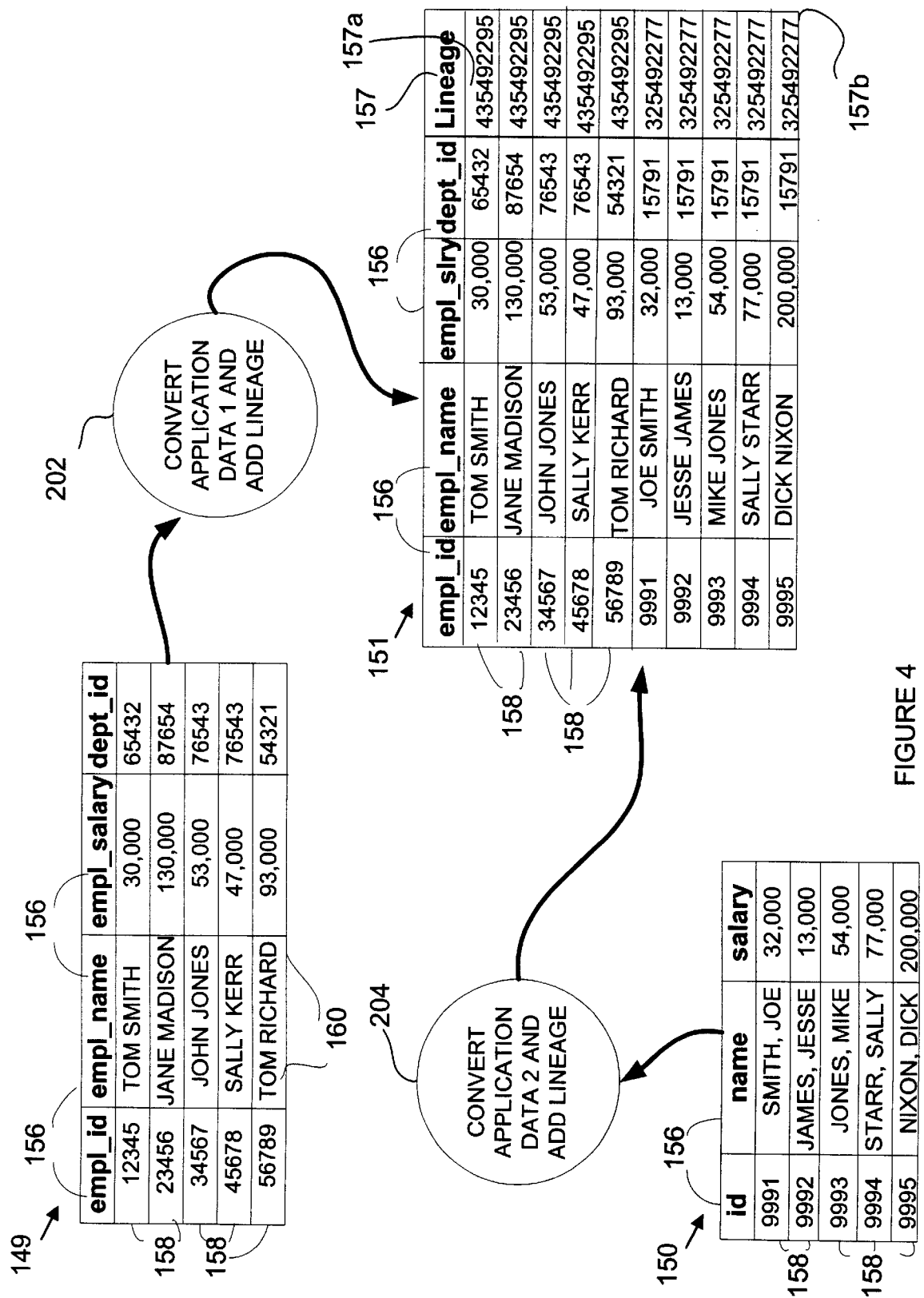
FIG. 4 is a diagram showing the transformation of data as it moves from source databases to a destination database.

FIG. 4 shows an exemplary transformation of data as it moves from source databases to a destination database. In this exemplary transfer, data is merged from two different tables that reside in two different databases into a third table residing in a third database. For example, table 150 resides in database 72a whereas table 149 resides in database 72b. The tables are merged into a third table 151 that is maintained in database 70.

Although both tables 149, 150 contain similar information, it is not in an identical format. As a result, the data must be transformed (i.e., conformed in accordance with Step 460 (FIG. 10) into the form at of table 151. F or example, table 149 maintains a column empl_name that contains employee names as first name followed by last name; whereas, table 150 maintains a column name that contains employee names as last name followed by first name. Table 151 contains employee names in the form of table 149. In order for the name columns of table 150 to be inserted into the empl_name column of table 151, the name data must be converted to the proper form. Similarly, table 149 does not contain dept_id information.

The above example illustrates that data moving between databases may need to be transformed in some manner before insertion into the target database. In FIG. 4, for example, transformation application 204 transforms the data of table 149 into proper form for table 151 and transformation application 202 transforms the data of table 150 into proper form for table 151. Again, both transformation applications 202 and 204 correspond to Step 460 (FIG. 10).

A user of the data contained in table 151 may want to trace the lineage of the data for the purpose of verifying its accuracy, tracing it source, and so on. To that end table 151 contains an additional column 157. Lineage column 157 contains information to provide a link to the lineage of the data. In the present example, notice that each row that passes through transform 202 is appended with the same unique data lineage value. Each row passing through transform 204 is appended with a unique identifier that is different from the identifier associated with the rows originating from table 150.

The data lineage information attached to the data is preferably stored as a data lineage data type. A data lineage data type comprises a globally unique identifier that is assigned to a row of data in a table. The globally unique identifier preferably uniquely identifies data as having a particular lineage, preferably on at least a table level, and more preferably on a row level. Hence, two or more rows of data having identical data lineage values will have a common lineage.

Figure 5:
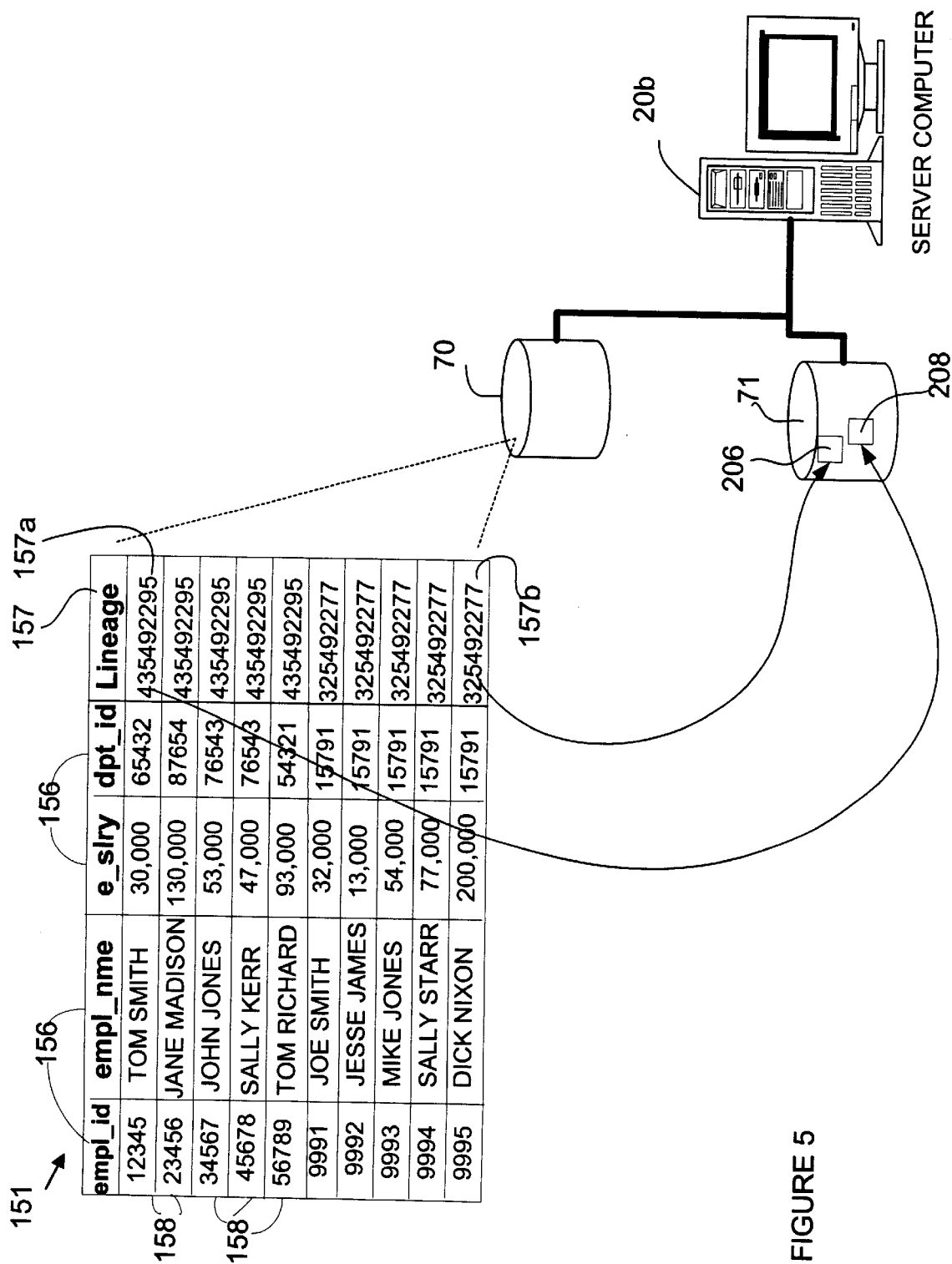
FIG. 5 shows the destination database table rowset shown in FIG. 4, as well as the binding of data lineage information to rows of data in that table.

Referring to FIG. 5, for example, data lineage value "435492295" identifies one set of rows sharing a common lineage and "32549227" identified another set of rows sharing a common lineage. Based on this example, a user comparing a row having lineage value "435492295" and a row having a lineage value "32549227" can know at least that the two rows have origins in different tables.

According to another aspect of the present invention, the data lineage data type can contain a value that points to an object containing lineage additional lineage information. Referring to FIG. 5, this further aspect of data lineage is illustrated. Again, table 151 having a data lineage data type column appended to the data is shown.

Table 151 is stored in database 70, which is maintained by server computer 20b. Also coupled to server computer 20b is an object repository 71 which may be maintained as part of database 70 but which is preferably maintained as a separate database. Repository 71 contains two exemplary objects, 206 and 208. Object 206 is pointed to by data lineage value "435492295" and object 208 is pointed to by data lineage value "32549227." That is, having the unique data lineage value, a corresponding data lineage object can be located in repository 71. By examining the contents of the corresponding data lineage object, further data lineage information is provided for all data that is bound to that data lineage object.

Figure 6:
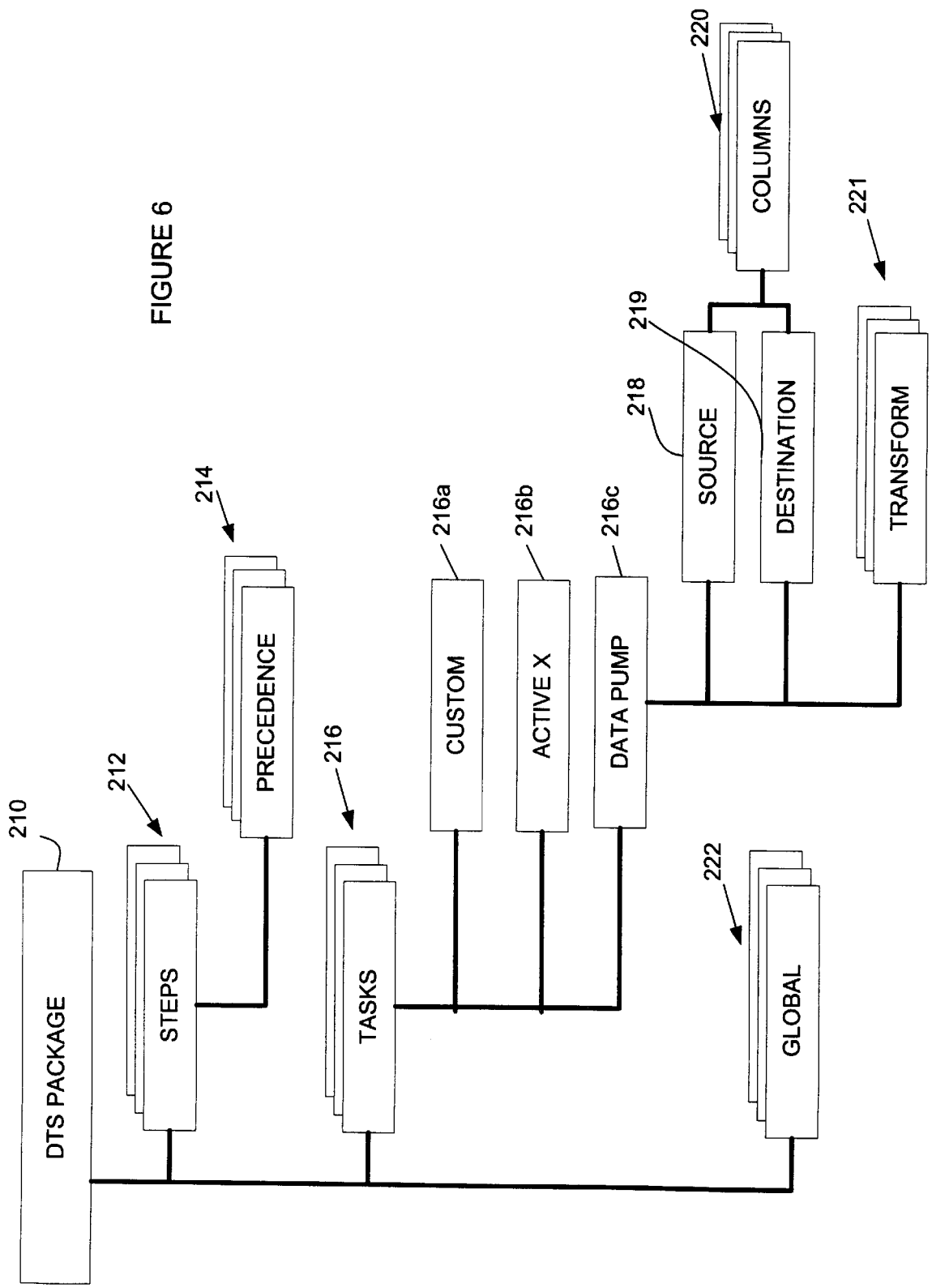
FIG. 6 is a functional diagram of a data transformation package (task) module.

Turning now to FIG. 6, it shows a functional diagram of a data transformation package (task) module. As illustrated, each package 210 comprises: a) steps 212 that define workflow for the package 210; b) task(s) 216 that perform the actual operations on data, such as convert the data among formats (e.g., convert from spread sheet to database form) or transform the data to a format of the destination table; and c) global variables 222 that are available system wide. Each package 210 can be stored in a Component Object Module (COM) file.

COM's are modules designed in accordance with the object oriented programming model. Object-oriented programming allows the use and re-use of program modules without knowledge of internal state and procedures of the modules.

Turning back to FIG. 6, step 212 objects coordinate the flow of control of execution of tasks 216. A task 216 that does not have an associated step 212 object is never executed. The step 212 object also establishes a precedence constraint, if any, associated with the corresponding task 216.

For example, it may be the case that data must be successfully transformed (Step A) before it can be exported to a destination database. The successful completion Step B should then be a precedence constraint on Step A.

Thus, precedence constraints are events which must occur prior to execution of the corresponding task 216. Thus, in addition to specifying its associated task 216, each step 212 also defines a precedence constraint 214 via two additional members: 1) a step identifier; and 2) a constrain type. The step identifier determines which step comprises the event which must occur. The constraint type determines whether the step specified in the step identifier must succeed, fail or merely complete for the constraint to be satisfied. Each step 212 is executed when each of its precedence constraints 214 is satisfied.

More particularly, the task 210 corresponding to the step 212 eligible for execution is executed, possibly on a new thread. Threads, which represent processes which can run in parallel, are well known in the art. Thus, multiple tasks 212 can take place at once.

Again, tasks 216 define actual operations to be performed on data (e.g., by the data pump). For example, tasks 216 may convert the data among formats (e.g., convert from spreadsheet to database form). Once the data is in a usable format, transformation tasks 216 transform the data before moving it to the destination row (e.g., see FIG. 4 showing the conversion of name in table 149). The tasks could be custom procedural scripts (ActiveX scripts), or simple data pump transmissions. A task defines the source table 218, the destination table 219, and corresponding columns that join the two tables together. And, a task's 216 transformation algorithm 221 defines how the data is changed.

Thus, the DTS packages 210, which may be incorporated into a COM based architecture, also allow the specification of numerous tasks 216, as well as any complex workflow and scheduling relationships among them. Existing processing environments which provide for specification of such workflow and scheduling and precedence relationships require a pre-determined specification (e.g., in the form of a tree) of all such relationships among all tasks. By contrast, COM based DTS packages 210 allow specification of such overall scheduling relationships via specification of precedence and priority for each task 216 separately, one task 216 at a time. Thus, overall scheduling relationships need not be known in advance, so long as precedence constraints for individual steps 212 are known.

Figure 7A:
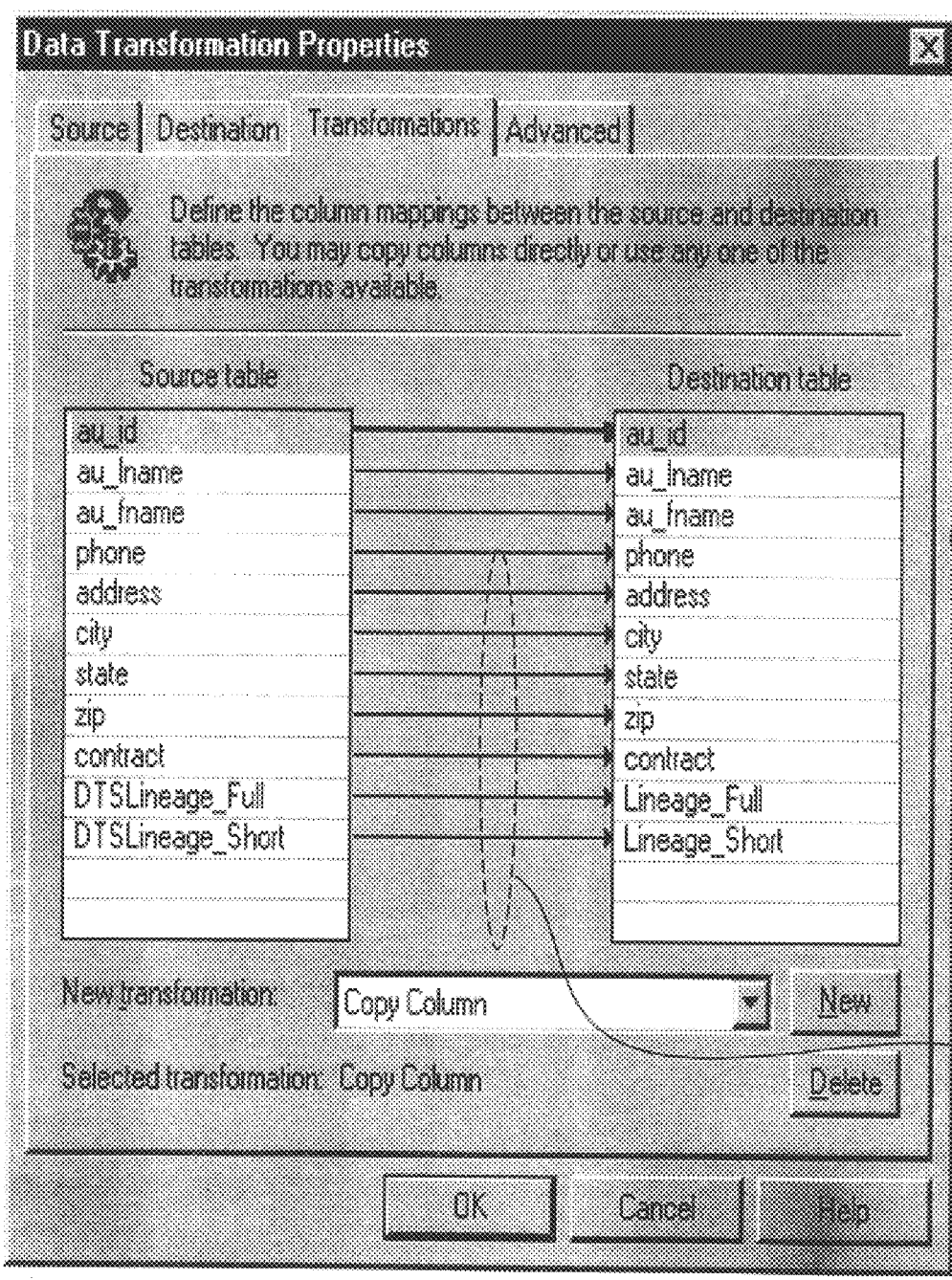
FIGS. 7A–7C are depictions of a graphical interface for specifying source data selection, a destination database location and the mapping of source and destination column names.
Figure 7B:
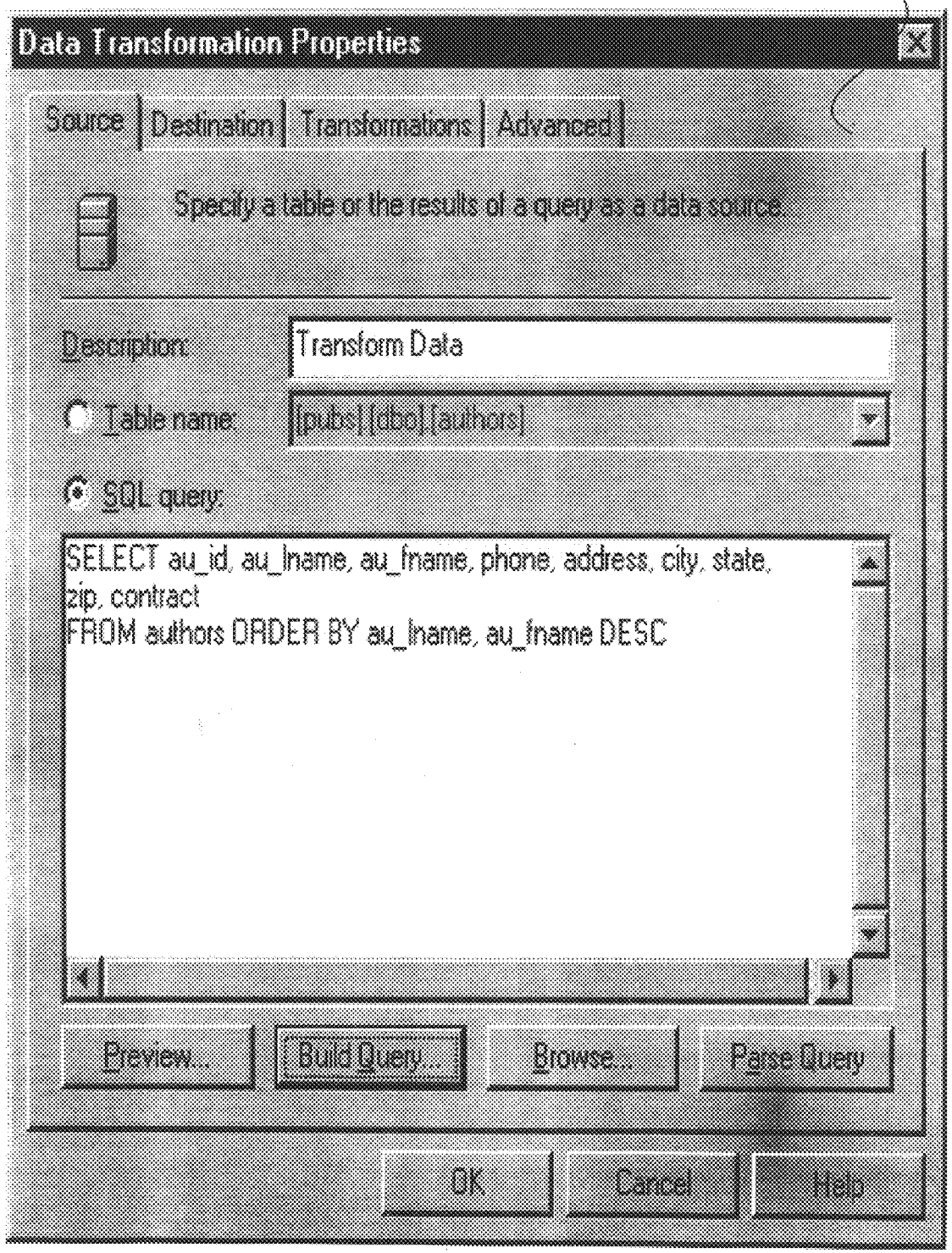
Figure 7C:
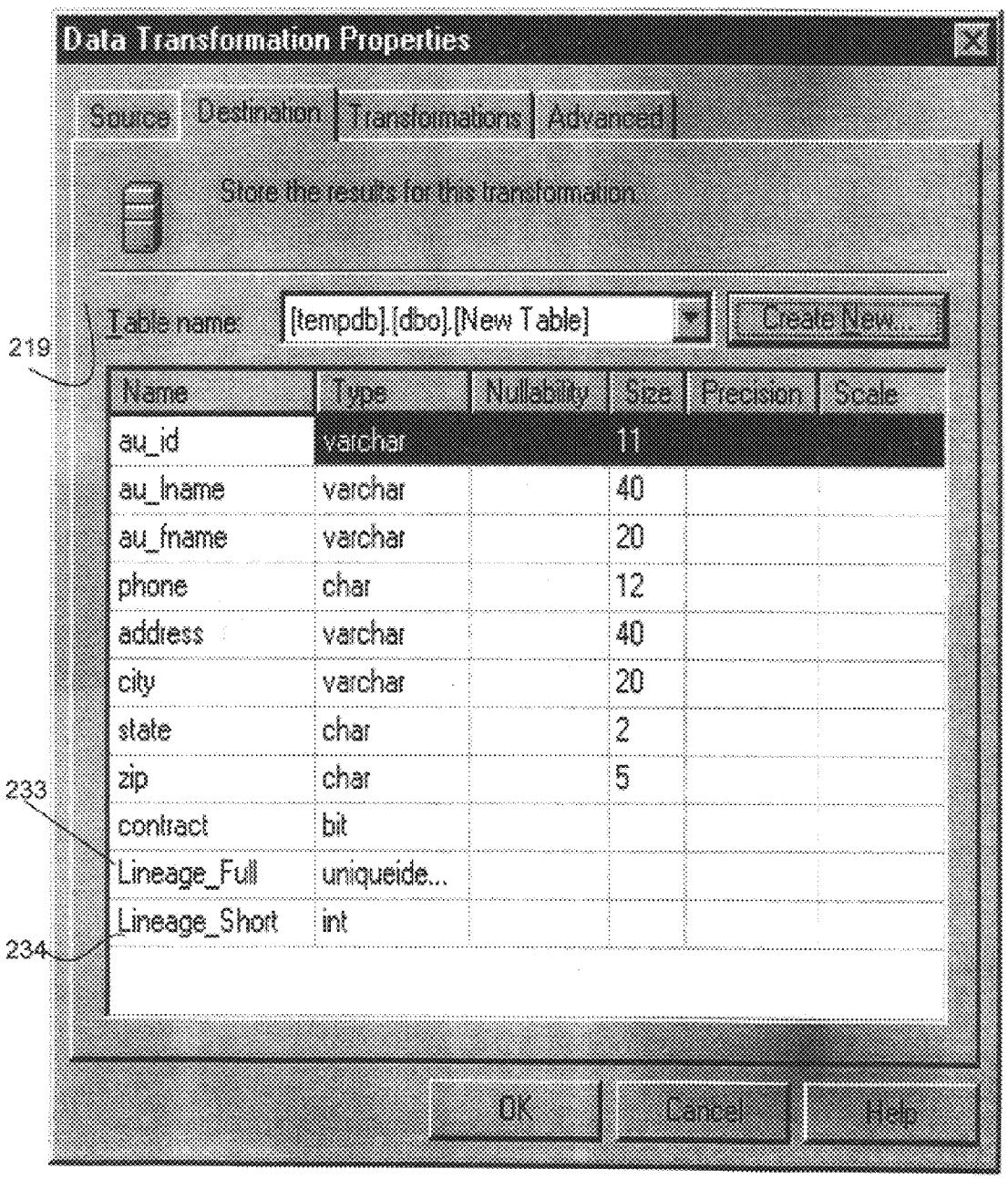

FIGS. 7A–7C show an exemplary user interface for specifying a transform for moving data from an external source table (e.g., from database 72a) into a destination table (e.g., to database 70) while adding data lineage information by way of the "data pump". Here, dialog boxes corresponding to package boxes 218, 219, and 221 are provided that graphically allows users to import and transform data. In FIG. 7B, a user can define the selected rows of the selected table to import. Here, a definition is provided by way of an SQL query. In FIG. 7C, a user can define a destination table to accept the data to be imported. Finally in FIG. 7A, a user can define the relationship of source to destination rows as indicated by arrow 220 and select a predefined transformation to apply to the data during the importation. A DTS package 210 may be created via such user specification in dialog boxes.

Here, a simple row copy has been selected. Notably, two columns have been added to the destination column: Lineage_Full 233; and Lineage_Short 234.

Lineage_Full contains a unique identifier as described in detail above. Lineage_Short is an integer number. As a result, as the data is moved into the destination table, the system automatically adds the data lineage value for each row passing through the transform 221. Before or after the transform is complete, a copy of the package is stored in repository 71 (See FIG. 5). Thereafter, at any time in the future, a user can retrieve and view the exact package that was used to transform the data as it moved into the database by using the lineage pointer to recover the package from the repository.

FIG. 8 illustrates a simple VISUAL BASIC transformation script 216b that performs the same function as the graphical importation described above in reference to FIGS. 7A–7C. As with the UI package described above, the VISUAL BASIC transform forms part of a package 210 that is also stored in repository 71 and pointed to by a data lineage value for all rows that it transformed.

While the invention has been described and illustrated with reference to specific embodiments, those skilled in the art will recognize that modification and variations may be made without departing from the principles of the invention as described above and set forth in the following claims. In particular, the invention may employed with any type of database including those not in relational format. Accordingly, reference should be made to the appended claims as indicating the scope of the invention.

What is claimed is:

1. A computer system including a processing unit, the computer system also including:

a user interface element comprising instructions executed by the processing unit, the user interface element prompting a user to specify source data and a destination database; and a data pump element comprising instructions executed by the processing unit, the data pump element causing extraction of the source data from a first storage area, conforming of the extracted source data into a format corresponding to the destination database and storage of the extracted source data in the destination database wherein the source data is buffered such that the extraction of the source data and the storage of the extracted source data in the destination database occur simultaneously.

2. The computer system of claim 1 wherein data pump element processes are initiated by a package.

3. The computer system of claim 2 wherein the package incorporates language script commands.

4. The computer system of claim 1 wherein, prior to the extraction of source data from a first storage area, source data is converted into a tabular format.

5. The computer system of claim 4 wherein the source data is spread sheet data.

6. The computer system of claim 4 wherein the source data is text data.

7. The computer system of claim 1 wherein the conforming of the extracted source data into a format corresponding to the destination database comprises reordering the extracted source data to correspond to an ordering of data in the destination database.

8. The computer system of claim 1 wherein the data pump element causes transformation of the extracted source data.

9. The computer system of claim 1 wherein the data pump element is incorporated into a package.

10. The computer system of claim 9 wherein the extraction of the source data from a first storage area, the conforming of the extracted source data into a format corresponding to the destination database and the storage of the extracted source data in the destination database each comprise a package task.

11. The computer based method of claim 10 wherein the task has an associated precedence constraint.

12. A method for constructing a database, the method comprising the steps of:

a. accepting a source data specification from the user;

b. accepting a destination storage location specification from the user;

c. extracting data corresponding to the source data specification;

d. transforming the extracted data;

e. conforming the extracted data in accordance with a format corresponding to the destination storage location; and f. storing the extracted data in a storage area corresponding to the destination storage location;

g. buffering the extracted data such that steps c and f occur simultaneously.

13. The method of claim 12 also comprising the step of converting source data into tabular format.

14. The method of claim 13 wherein the source data is spread sheet data.

15. The method of claim 13 wherein the source data is text data.

16. The method of claim 12 wherein step e comprises reordering the extracted data to correspond to an ordering of data in the destination storage location.

17. The method of claim 12 wherein steps a–f are incorporated into a plurality of a package tasks.

* * * * *

UNITED STATES PATENT AND TRADEMARK OFFICE
CERTIFICATE OF CORRECTION

PATENT NO.   : 6,356,901 B1
DATED        : March 12, 2002
INVENTOR(S)  : MacLeod et al.

It is certified that error appears in the above-identified patent and that said Letters Patent is hereby corrected as shown below:

<u>Column 1,</u>
Line 12, please delete "even date herewith".

<u>Column 3,</u>
Line 36, please delete the word "he" and insert therefor -- the --.

Signed and Sealed this

Twenty-ninth Day of October, 2002

Attest:

Attesting Officer

JAMES E. ROGAN
*Director of the United States Patent and Trademark Office*